(12) United States Patent
Nakami

(10) Patent No.: US 7,646,405 B2
(45) Date of Patent: *Jan. 12, 2010

(54) OUTPUT IMAGE ADJUSTMENT OF IMAGE DATA

(75) Inventor: Yoshihiro Nakami, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 423 days.

This patent is subject to a terminal disclaimer.

(21) Appl. No.: 10/520,858

(22) PCT Filed: Jul. 11, 2003

(86) PCT No.: PCT/JP03/08875

§ 371 (c)(1),
(2), (4) Date: Jan. 10, 2005

(87) PCT Pub. No.: WO2004/008755

PCT Pub. Date: Jan. 22, 2004

(65) Prior Publication Data

US 2005/0254691 A1    Nov. 17, 2005

(30) Foreign Application Priority Data

Jul. 11, 2002    (JP) ............................. 2002-202350

(51) Int. Cl.
*H04N 5/228* (2006.01)
*H04N 5/76* (2006.01)

(52) U.S. Cl. ................................ 348/222.1; 348/231.3

(58) Field of Classification Search ............... 348/231.3, 348/362, 364, 224.1, 345, 312, 294; 382/120; 358/519, 505, 474

See application file for complete search history.

(56) References Cited

U.S. PATENT DOCUMENTS 5,513,018 A * 4/1996 Nisimura ..................... 358/474

(Continued)

FOREIGN PATENT DOCUMENTS

JP    2000-059629    2/2000

(Continued)

OTHER PUBLICATIONS

Abstract of Japanese Patent Publication No. 2000-059629, Pub. Date: Feb. 25, 2000, esp@cenet database.

(Continued)

*Primary Examiner*—Lin Ye
*Assistant Examiner*—Amy Hsu
(74) *Attorney, Agent, or Firm*—Martine Penilla & Gencarella, LLP

(57) ABSTRACT

The present invention is an image processing apparatus for processing an image data using an image file which includes the image data and image processing control information to be used for processing the image data. The apparatus comprises an automatic picture quality adjuster configured to automatically regulate lightness of the image data according to lightness of a whole image expressed by the image data and an adjustment degree determiner configured to determine a degree of the auto adjustment based on the image processing control information.

7 Claims, 9 Drawing Sheets

U.S. PATENT DOCUMENTS

| | | | |
|---|---|---|---|
| 5,872,643 A * | 2/1999 | Maeda et al. | 358/518 |
| 5,937,218 A * | 8/1999 | Amano et al. | 396/311 |
| 6,373,993 B1 * | 4/2002 | Nomura | 382/274 |
| 6,643,398 B2 | 11/2003 | Moriwaki | |
| 7,042,603 B2 * | 5/2006 | Masao et al. | 358/519 |
| 7,158,183 B1 * | 1/2007 | Ohta | 348/364 |
| 7,375,848 B2 | 5/2008 | Nakami et al. | |
| 7,511,853 B2 * | 3/2009 | Nakami | 358/1.9 |
| 2002/0008771 A1 * | 1/2002 | Uchino et al. | 348/362 |
| 2003/0053095 A1 | 3/2003 | Nakami | |
| 2005/0052540 A1 * | 3/2005 | Nakami | 348/222.1 |

FOREIGN PATENT DOCUMENTS

| | | |
|---|---|---|
| JP | 2001-177749 | 6/2001 |
| JP | 2001-298660 | 10/2001 |
| JP | 2002-156711 | 5/2002 |
| JP | 2002-314809 | 10/2002 |
| JP | 2003-060935 | 2/2003 |

OTHER PUBLICATIONS

Abstract of Japanese Patent Publication No. 2002-314809, Pub. Date: Oct. 25, 2002, esp@cenet database.

Abstract of Japanese Patent Publication No. 2003-060935, Pub. Date: Feb. 28, 2003, Patent Abstracts of Japan.

* cited by examiner

Values of Data in Light metering and their Meanings

| Values | Meanings |
|---|---|
| 0 | Unknown |
| 1 | Averaged light metering |
| 2 | Center emphasis light metering |
| 3 | Spot Light metering |
| 4 | Multi-Spot Light metering |
| 5 | Divisional light metering |
| 6 | Partial Light metering |
| 255 | Other Methods |
| Others | Scheduled |

In the Case of Underexposure

In the Case of Overexposure

Fig.9

Auto Image Adjustment of Digital Camera

There is some image file photographed in center emphasis light metering. Do you want execute auto correction of exposure (lightness)?

▶ *Yes*
The auto correction regulates the lightness over the whole image, and may give an inadequate lightness to a central area.

▶ *No*
No auto lightness correction will be executed, and the lightness over the whole image may be inadequate.

▶ *Print Both Images*
Both an image with auto lightness correction and an image without auto lightness correction are printed for an image file photographed in center emphasis light metering.

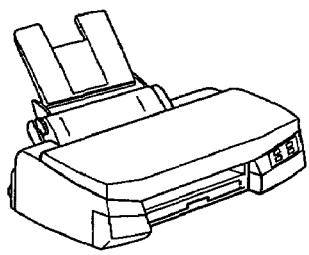

OUTPUT IMAGE ADJUSTMENT OF IMAGE DATA

TECHNICAL FIELD

The present invention relates to an image adjustment technique that adjusts the lightness of image data.

BACKGROUND ART

The picture quality of image data generated by a digital still camera (DSC), a scanner, or other image input devices is often subjected to automatic adjustment on a personal computer or a printer. Parameters relating to adjustment of the picture quality include brightness (lightness) of an image. The brightness of the image is regulated, such that the reflectivity of an image corresponding to the brightness is made approximate to the reflectivity of a standard light reflector (for example, a reflector having a reflectivity of 18%), according to the brightness over the whole image expressed by the image data. Such regulation prevents the whole image from being excessively darkened or brightened.

In some cases, the user may desire adequate expression of the brightness not over the whole image but in only a part of the image. For example, in the case of portraits, emphasis is given not on the brightness over the whole image but on the brightness of only a figure, which is the main subject. In such cases, regulation according to the brightness over the whole image may cause the figure from being excessively brightened.

DISCLOSURE OF THE INVENTION

The object of the present invention is thus to solve the problems of the prior art technique discussed above and to provide a technique of preventing automatic adjustment of lightness of an image against the user's intention for photographing.

In order to attain at least part of the above and the other related objects, a first application of the present invention is directed to an image processing apparatus for processing an image data using an image file. The image file includes the image data and image processing control information to be used for processing the image data. The apparatus comprises an automatic picture quality adjuster and a regulation degree determiner. The automatic picture quality adjuster is configured to automatically adjust lightness of the image data according to lightness of a whole image expressed by the image data. The adjustment degree determiner is configured to determine a degree of the auto adjustment based on the image processing control information.

The first application of the invention determines the degree of the auto adjustment of the lightness over the whole image expressed by the image data, based on the image processing control information included in the image file. For example, when the user intends to express the brightness adequately not over the whole image but in only a part of the image, this arrangement desirably reduce forcible auto adjustment against the user's intention.

In one preferable embodiment of the image processing apparatus, the image processing control information includes light metering information showing whether a specific metering method is used for photographing. The specific metering method is measuring light only in a specified field of view that is a part of the image. The adjustment degree determiner is configured to reduce the degree of the auto adjustment when the light metering information shows that the specific metering method is applied for photographing.

When the specific metering method that measures light only in the specified field of view is applied for photographing, it is expected that the user intends to adequately express the lightness in the specified field of view. The arrangement of this embodiment desirably prevents forcible auto adjustment against the user's intention for photographing. The terminology 'reducing the degree of auto adjustment' includes reduction of the auto adjustment degree to zero, that is, complete prohibition of the auto adjustment.

In the image processing device of the invention, it is preferable that the light metering information represents a selected method of light metering among a plurality of metering methods including averaged metering, center-weighted metering, spot metering, multi-spot metering, divisional light metering, and partial light metering, and the specific metering methods include the spot metering, the multi-spot metering, and the partial light metering.

In one preferable application of the image processing apparatus, the adjustment degree determiner is configured to provide a user with a user interface to allow the user to select the degree of the auto adjustment when the image processing control information indicates the center-weighted metering. The terminology 'selecting the degree of auto adjustment' includes an option of setting '0' to the auto adjustment degree, that is, complete prohibition of the auto adjustment.

The center-weighted metering with a greater degree of emphasis is closer to the partial light metering, while the center-weighted metering with a less degree of emphasis is closer to the divisional light metering. The arrangement of providing the user interface that allows the user to select the degree of the auto adjustment of the auto adjustment ensures the image processing suitable for the user's intention for photographing.

A second application of the invention is directed to an image processing apparatus for processing an image data using an image file. The image file includes the image data and image processing control information to be used for processing the image data. The apparatus comprises an automatic picture quality adjuster and an adjustment mode selector. The automatic picture quality adjuster is configured to automatically adjust lightness of the image data according to lightness of a whole image expressed by the image data in one of a plurality of adjustment modes. The adjustment mode selector is configured to select one of the plurality of adjustment modes according to the image processing control information. The plurality of adjustment modes include a plurality of adjustment modes having a difference in a degree of lightness adjustment. Here the multiple adjustment modes include plural adjustment modes having a difference in a degree of lightness correction.

The present invention is also directed to an image output apparatus for outputting image data in response to an image file, which includes the image data and image processing control information used for image processing of the image data. The image output device of the invention includes the image processing device having any of the arrangements discussed above, and an image output unit that outputs an image according to the image-processed image data.

The technique of the present invention is actualized by a variety of applications, which include image file generation devices, image output devices, image processing methods, computer programs that attain the functions of such devices and methods, recording media in which such computer programs are recorded, and data signals that include such computer programs and are embodied in carrier waves.

BRIEF DESCRIPTION OF THE DRAWINGS

FIG. 9 shows a user interface that allows a user to select execution or prohibition of auto correction.

BEST MODE FOR CARRYING OUT THE INVENTION

One mode of carrying out the invention is discussed below as a preferred embodiment in the following sequence:

A. Construction of Image Processing System

B. Structure of Image File

C. Image Processing by Computer PC

D. Modifications

A. Construction of Image Processing System

Figure 1:
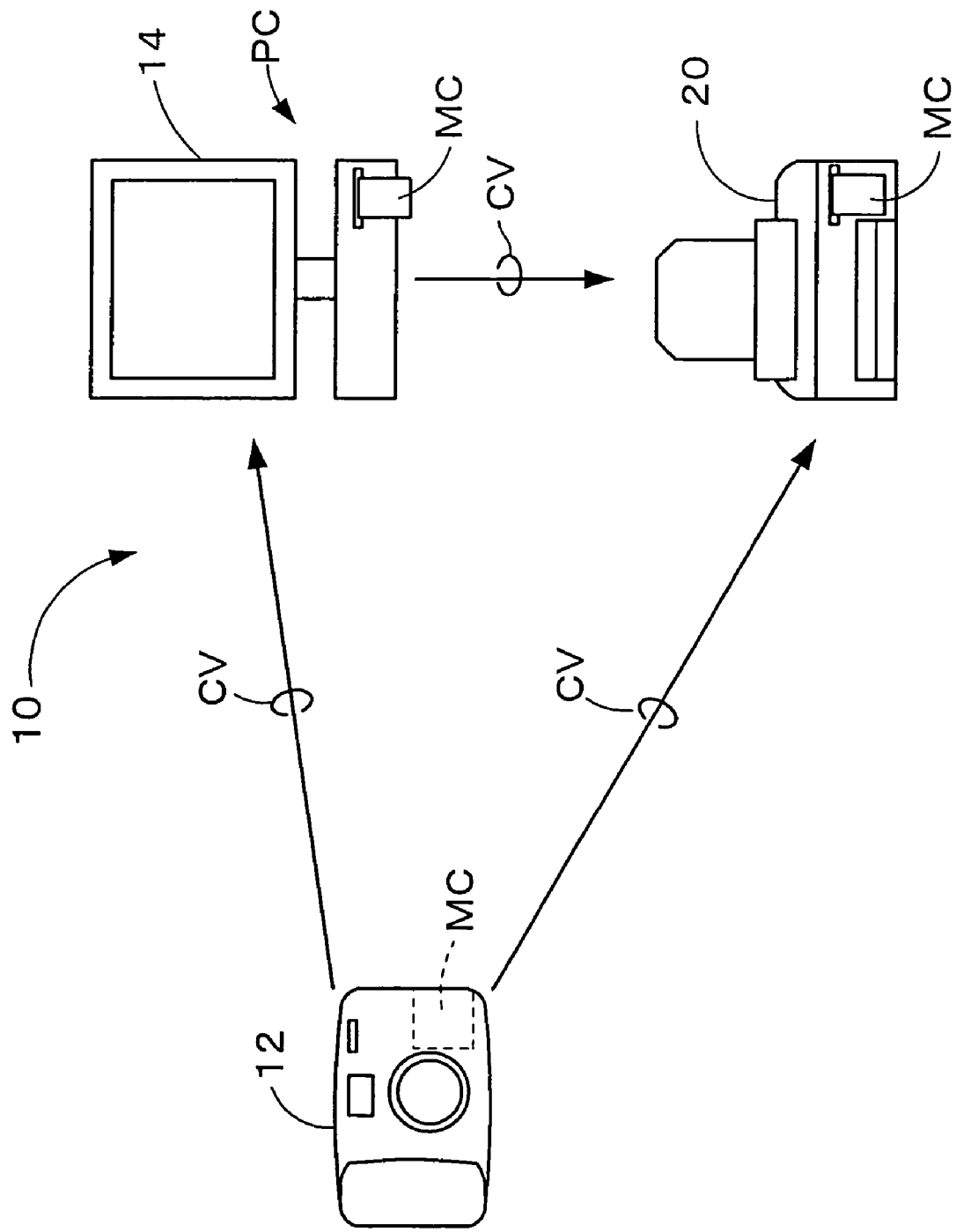
FIG. 1 illustrates an image processing system in one embodiment of the invention.

FIG. 1 illustrates an image processing system 10 in one embodiment of the invention. The image processing system 10 includes a digital still camera 12 functioning as an input device that generates original image data, a personal computer PC functioning as an image processing device that performs image processing of the original image data generated by the digital still camera 12, and a color printer 20 functioning as an output device that outputs processed images.

The digital still camera 12, the personal computer PC, and the color printer 20 are mutually connectable via a cable CV. In the state of connection by the cable CV, the digital still camera 12 and the other constituents are allowed to transmit and receive image files via the cable CV. In the status of no connection by the cable CV, the digital still camera 12 and the other constituents are allowed to transmit image files therebetween via a memory card MC.

Figure 2:
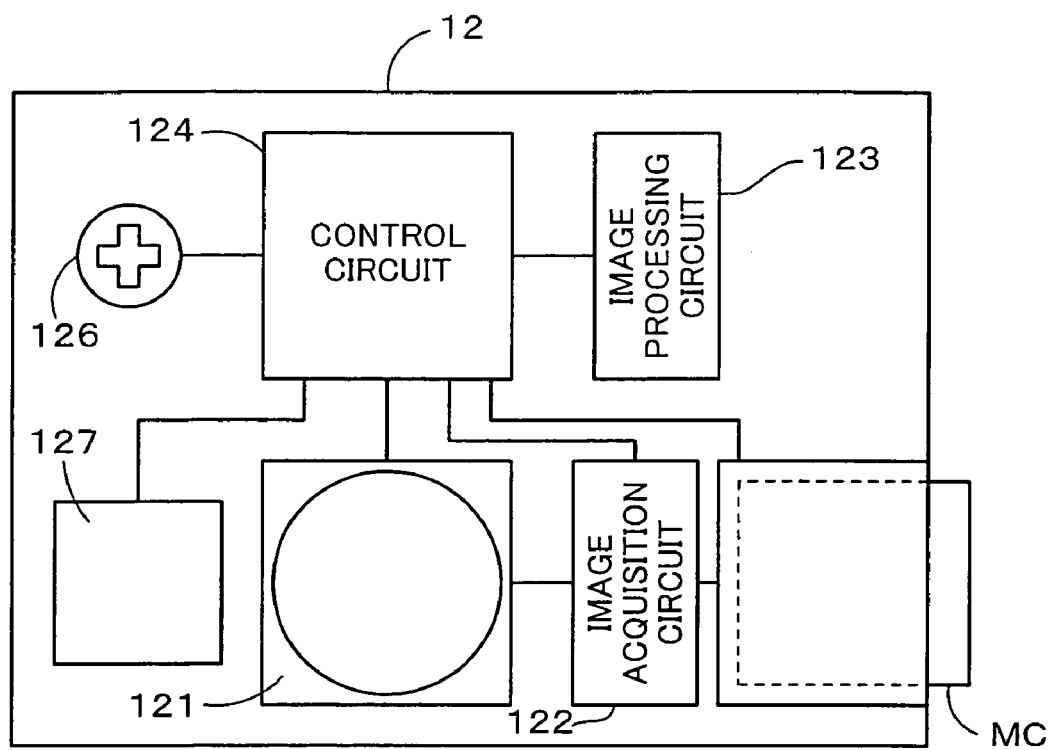
FIG. 2 is a block diagram schematically illustrating the structure of a digital still camera working as an input device of generating image data.

FIG. 2 is a block diagram schematically illustrating the structure of the digital still camera 12 working as the input device of generating image data. The digital still camera 12 focuses an image through an optical lens on a charge coupled device (CCD) so as to electrically record a still image.

The digital still camera 12 includes an optical circuit 121 having a CCD that converts optical signals into electrical signals, an image acquisition circuit 122 that controls the optical circuit 121 to acquire image data, an image processing circuit 123 that processes the acquired image data, and a control circuit 124 that controls these respective circuits. The digital still camera 12 further has a selection/decision button 126 as a user interface and a liquid crystal display 127 used for preview of photographed images and user interfaces.

The photographing process of the digital still camera 12 (that is, the process of acquiring image data) includes the steps of (a) the user's setting of a photographing mode, (2) photographing (input of image data), (3) image processing, and (4) recording of an image file, which are carried out sequentially. The user's setting of the photographing mode includes selection of a method of light metering. Available options of the light metering include divisional light metering and spot light metering.

The divisional light metering divides a finder plane corresponding to an image area into multiple sections, measures the light in these multiple sections, and computes an adequate exposure based on information on the multiple sections. The spot light metering measures the light in only a spot area (for example, an area in the vicinity of the center of the finder plane) and computes an adequate exposure.

The user checks the display contents on the liquid crystal display 127 and manipulates the selection/decision button 126 to select a desired method of light metering. On selection of the light metering, the adequate exposure is computed in real time, and appropriate settings of an aperture and a shutter speed are determined according to the computed exposure.

The user presses a shutter button to effectuate photographing. In response to a press of the shutter button, photographing is performed with the settings of the aperture and the shutter speed determined in the above manner. When the face of a figure as a main subject is located in the spot area in the selected spot light metering, the settings of the aperture and the shutter speed are determined on the basis of the brightness of the face of the figure. This arrangement performs photographing with the exposure optimized not for the whole finder plane but for the main subject to generate original image data.

The original image data thus generated are subjected to image processing for storage. This image processing is a pre-treatment of the original image data, prior to storage into the memory card MC. The general procedure converts the original image data into a JPEG format suitable for storage of photographic images. After conversion into the JPEG format, the procedure adds photographing information PI to the converted image data to create an image file.

The photographing information PI regards photographing conditions and includes information representing the selected light metering. The process of acquiring image data in the digital still camera 12 terminates with recording of the image file into the memory card MC. The structure of the image file will be discussed later.

Figure 3:
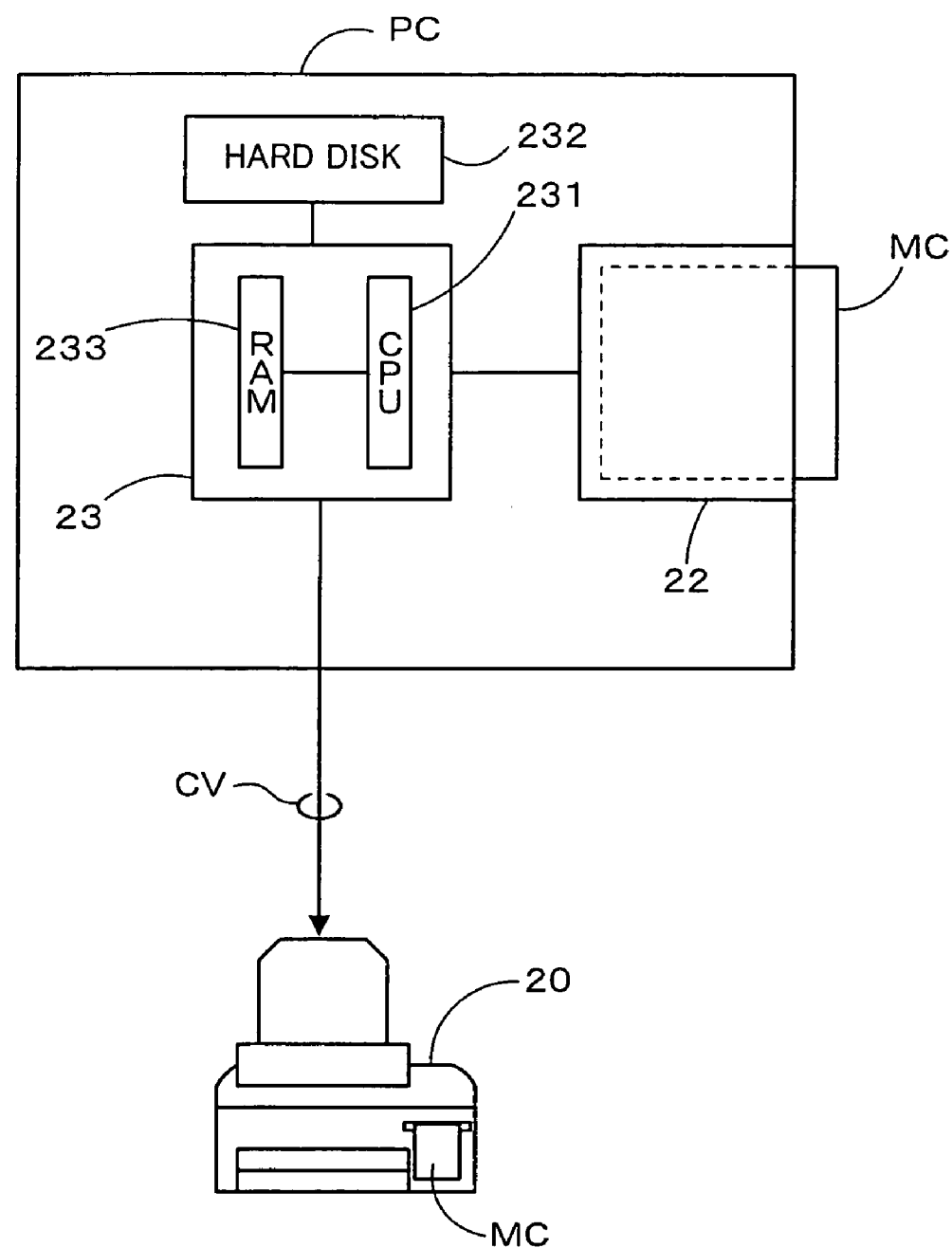
FIG. 3 is a block diagram schematically showing the configuration of a computer PC and a color printer as an output device of outputting image data.

FIG. 3 is a block diagram schematically showing the configuration of the computer PC and the color printer 20 as the output device of outputting image data. The computer PC has a slot 22 for reading an image file from the memory card MC inserted therein and a print data generation circuit 23 for generating print data, according to which the color printer 20 carries out printing. The print data generation circuit 23 includes a central processing unit (CPU) 231 that executes arithmetic operations for generation of print data, a hard disk 232 that stores programs executed by the CPU 231, results of the arithmetic operations by the CPU 231, and other data, and a random access memory (RAM) 233 that temporarily stores these programs and data.

The color printer 20 is capable of outputting color images. One typical example of the color printer 20 is an ink jet printer that ejects four different color inks, cyan (C), magenta (M), yellow (Y), and black (K) on a printing medium to form a dot pattern and thereby complete a printed image.

B. Structure of Image File

Figure 4:
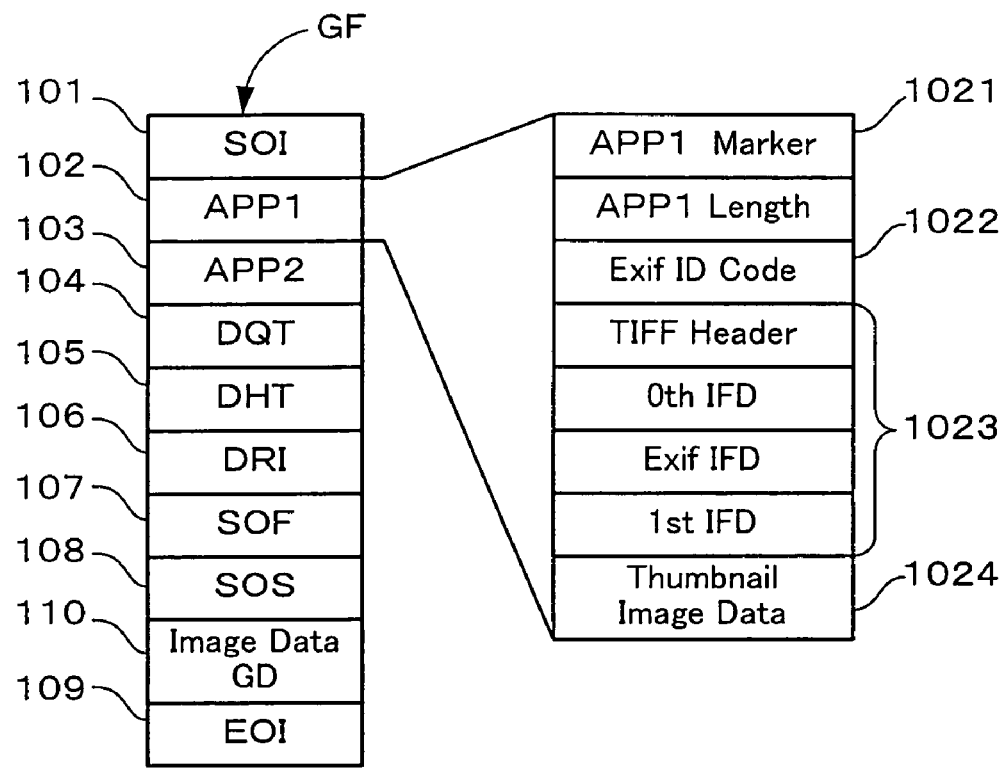
FIG. 4 schematically shows the structure of an image file GF in the embodiment of the invention.

FIG. 4 schematically shows the structure of an image file GF in the embodiment of the invention. The image file GF has a file structure in conformity with Exchangeable image file format (Exif) for digital still cameras. This format is specified by Japan Electronics and Information Technology Industries Association (JEITA). According to this format, JPEG-Exif files that store compressed JPEG data as image data are included in Exif files (files of the Exif format).

The image file GF includes an SOI marker segment 101 representing a header of compressed data, an APP1 marker segment 102 storing attribute information of the Exif format, an APP2 marker segment 103 storing Exif extended data, a DQT marker segment 104 defining a quantization table, a DHT marker segment 105 defining a Huffman table, a DRI marker segment 106 defining an insertion interval of a restart marker, an SOF marker segment 107 representing various parameters relating to frames, an SOS marker segment 108 representing various parameters relating to scanning, an EOI marker segment 109 representing a termination of the compressed data, and an image data storage area 110.

The APP1 marker segment 102 stores an APP1 marker 1021, an Exif identification code 1022, a TIFF header and other attribute information 1023, and thumbnail image data 1024. The attribute information 1023 has a TIFF structure with a file header (TIFF header) and includes, in the case of an Exif-JPEG file, $0^{th}$ IFD storing attribute information relating to compressed image data, Exif IFD storing the photographing information PI and other attribute information inherent to the Exif format and $1^{st}$ IFD storing attribute information relating to thumbnail images. The Exif IFD is pointed by an offset from the TIFF header stored in the $0^{th}$ IFD. Tags for identifying various pieces of information are used in the IFD, and the respective pieces of information may be referred to as tag names.

Figures 5A, 5B:
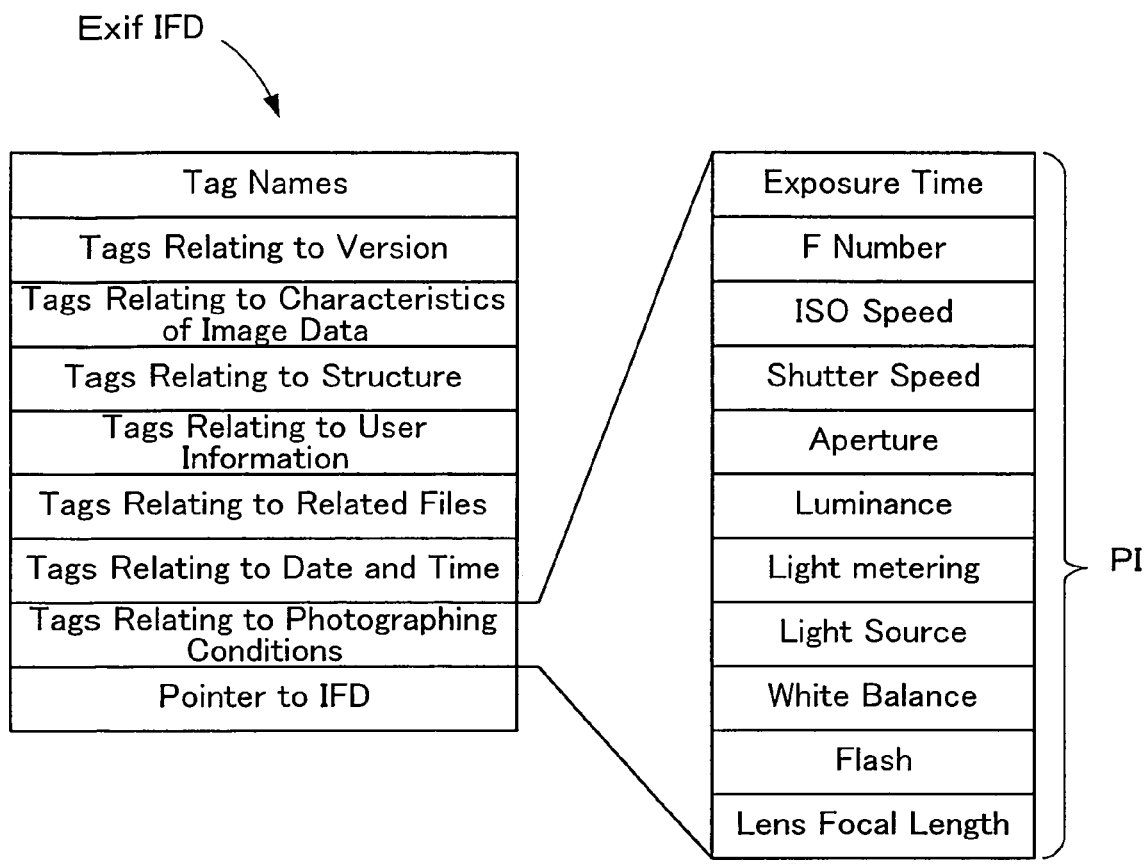
FIGS. 5(A) and 5(B) show one example of attribute information stored in Exif IFD of the image file GF.

FIG. 5 shows one example of the attribute information stored in the Exif IFD of the image file GF. FIG. 5(A) shows the structure of the attribute information stored in the Exif IFD. The attribute information includes various tags including tags relating to a version and tags relating to photographing conditions. The tags relating to the photographing conditions store settings of exposure time, F number of a lens, ISO sensitivity, shutter speed, exposure, luminance, light metering, and other parameters according to specified offsets as the photographing information PI. The photographing information PI may be recorded in the digital still camera 12 in the photographing process, as described previously.

FIG. 5(B) shows values of the data stored in the light metering segment and their meanings. For example, when the spot light metering is selected for photographing with the digital still camera 12, a value '3' is written in the process of recording an image file. In another example, a value '5' is recorded in the case of selection of the divisional light metering.

Among the methods of light metering shown in FIG. 5(B), the spot light metering, the multi-spot light metering, and the partial light metering measure the light in only a specific field of view that is a part of a printed image. The other methods of light metering measure the light over the whole visual field. The former three methods of light metering correspond to the 'specific metering method' in the terminology of the claims.

C. Image Processing by Computer PC

Figure 6:
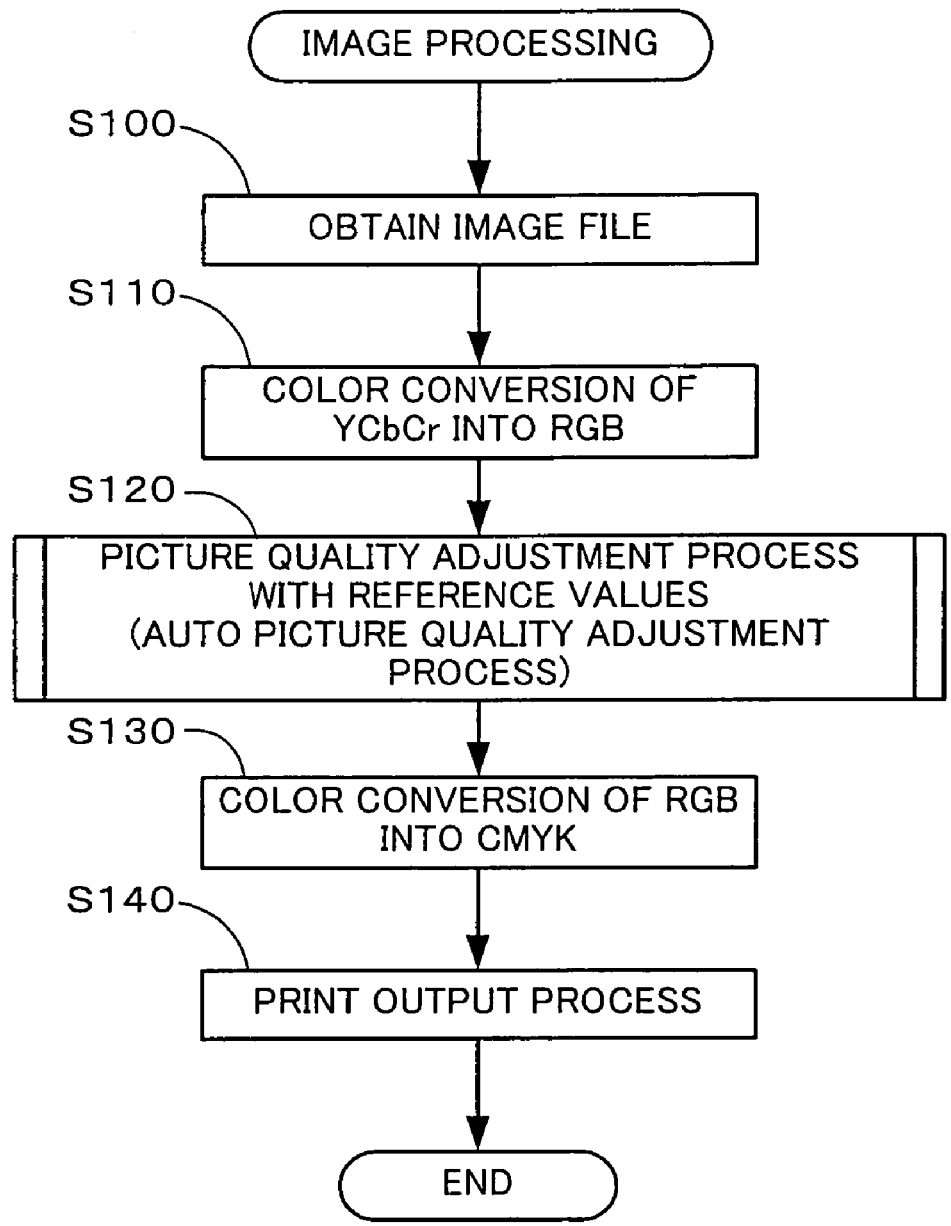
FIG. 6 is a flowchart showing an image processing routine executed by the computer PC.

FIG. 6 is a flowchart showing an image processing routine executed by the computer PC. At step S100, the CPU 231 reads the image file GF from the memory card MC inserted in the slot 22 and stores the image file GF into the RAM 233 included in the print data generation circuit 23. The image file GF stores image data of the JPEG file format as image data GD. The image data of the JPEG file format are constructed as compressed YCbCr data.

At step S110, the CPU 231 decompresses the compressed YCbCr data and carries out color conversion. The color conversion converts the YCbCr data into RGB data. Conversion into the RGB data is because the RGB data is the subject of image processing executed by the personal computer PC or the color printer 20.

At step S120, the CPU 231 makes the RGB data subjected to a picture quality adjustment process with reference values. The picture quality adjustment process with reference values adjusts the picture quality with desired standard values of parameters (reference values), which have been stored in advance in the hard disk 232. Such a picture quality adjustment process is an image processing technique and is generally referred to as auto picture quality adjustment process. The parameters adjusted by the auto picture quality adjustment process include lightness. The details of the auto picture quality adjustment process with regard to the lightness will be discussed later.

At step S130, the CPU 231 carries out color conversion to convert the image data (RGB data) undergoing the auto picture quality adjustment process into CMYK data. The CMYK color space is expressible with four color inks, cyan (C), magenta (M), yellow (Y), and black (K) available in the color printer 20. This color conversion process utilizes a lookup table, which represents a mapping of the RGB color system to the CMYK color system and is stored in the hard disk 232.

At step S140, the CPU 231 carries out a print output process of the resulting image data (CMYK data). In the print output process, the CPU 231 performs a halftoning process to generate print data including dot data, which represents the formation state of dots of the respective color inks, and transmits the generated print data to the color printer 20. This terminates the image processing routine.

Figure 7:
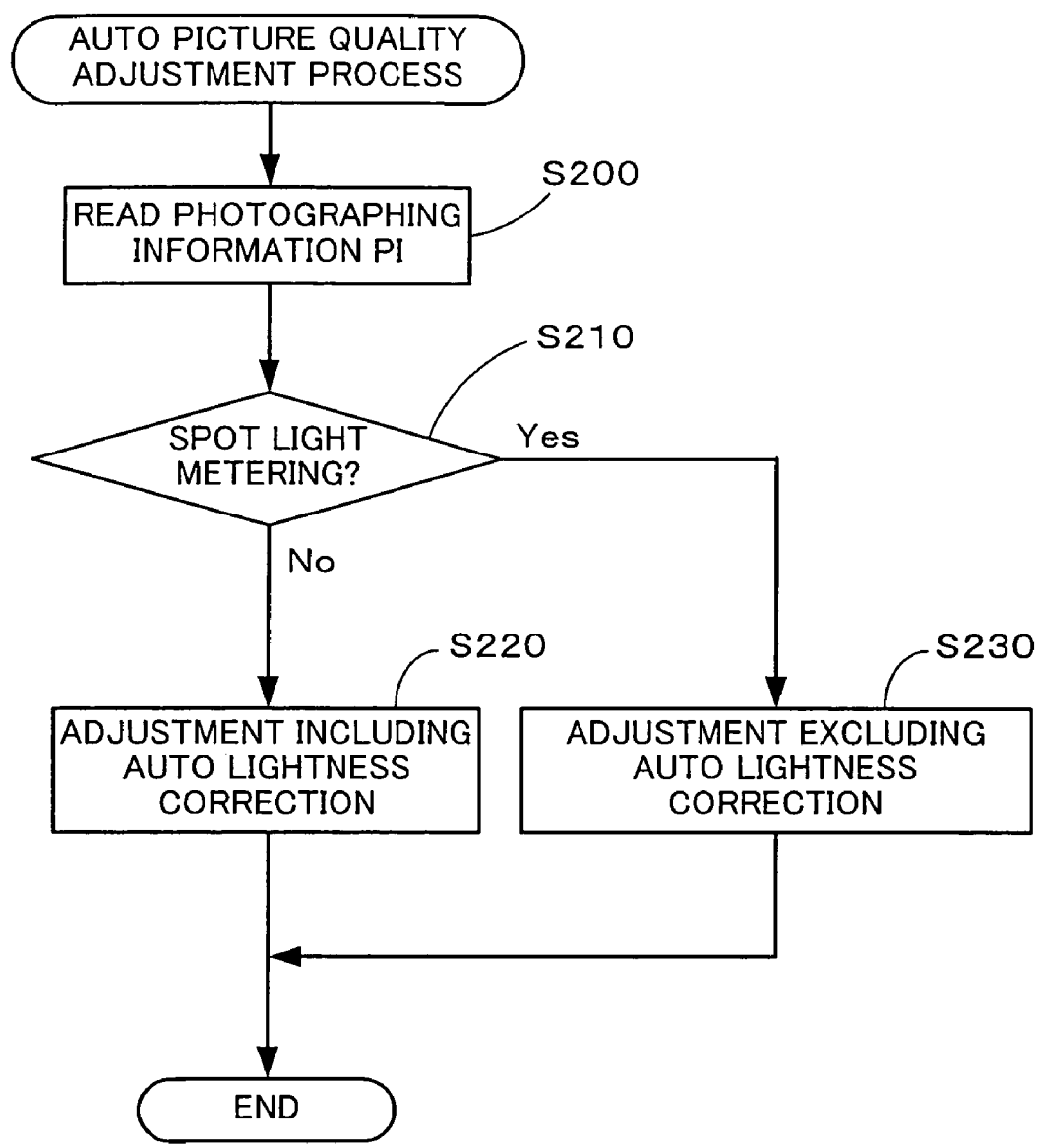
FIG. 7 is a flowchart showing a processing routine of auto picture quality adjustment process executed in the embodiment.

FIG. 7 is a flowchart showing the details of the auto picture quality adjustment process executed in this embodiment. At step S200, the CPU 231 reads the photographing information PI (see FIGS. 5(A) and 5(B)) stored in the Exif IFD of the image file GF. The photographing information PI includes a piece of information representing selection of either the divisional light metering or the spot light metering for photographing.

At step S210, the CPU 231 determines whether the selected light metering for photographing is the spot light metering, according to the read-out information. When the selected light metering is not the spot light metering, the program proceeds to step S220 to carry out auto adjustment including auto lightness correction. When the selected light metering is the spot light metering, on the other hand, the program proceeds to step S230 to carry out auto adjustment excluding auto lightness correction.

At step S220, the CPU 231 performs auto adjustment of the picture quality including the auto lightness correction. The auto lightness correction automatically lowers the lightness of an image reproduced on a printing medium in the event of an inadequate exposure for photographing, for example, in the case of an excessively bright image of the image data GD.

Figure 8A:
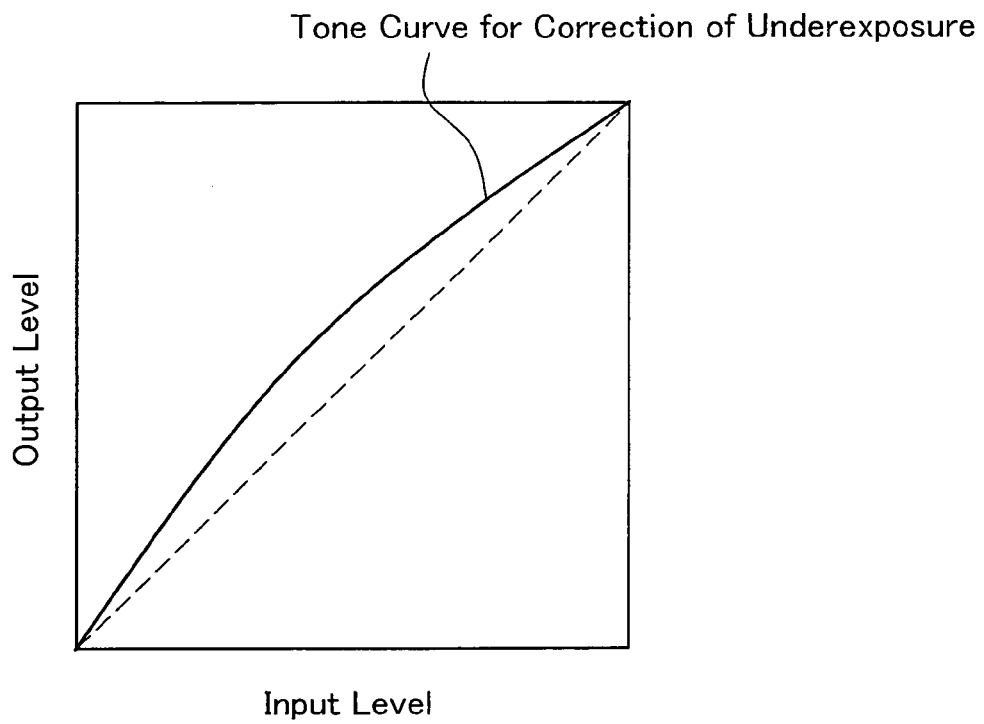
FIGS. 8(A) and 8 (B) show the specifications of auto lightness correction executed in the embodiment.
Figure 8B:
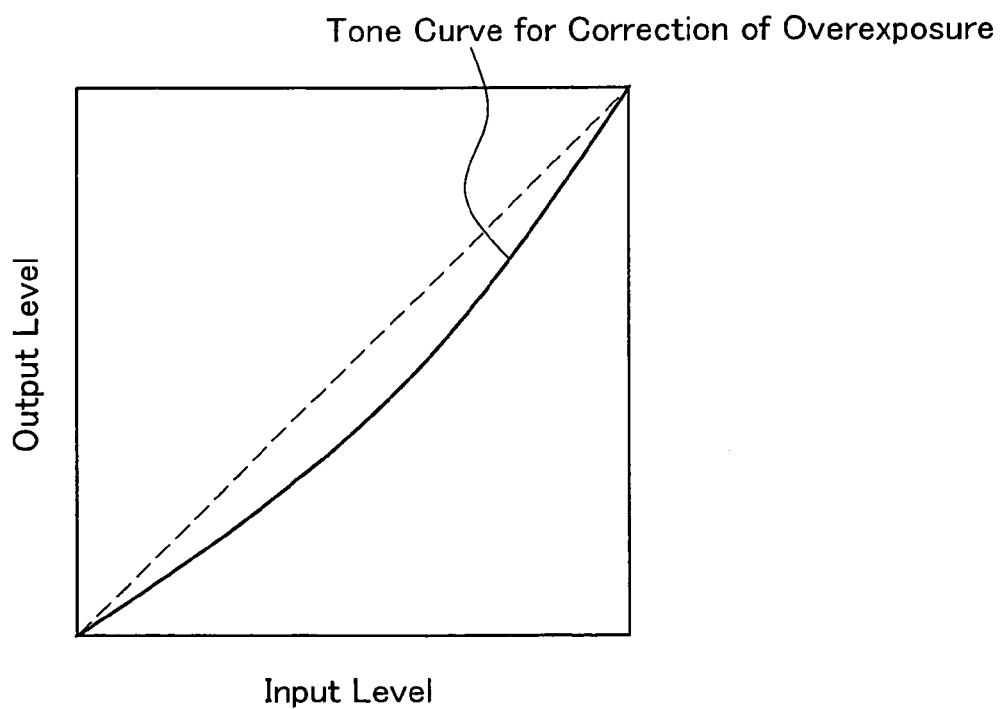

FIG. 8 shows the specifications of the auto lightness correction executed in this embodiment. FIG. 8(A) shows a tone curve used for correcting an underexposure, and FIG. 8(B) shows a tone curve used for correcting an overexposure. The input level represents values of image data before the auto lightness correction, and the output level represents values of image data after the auto lightness correction.

The auto lightness correction varies the shape of the tone curve to regulate the lightness of a printed image. This correction is performed to make the reflectivity of the whole printed image reproduced on a printing medium approximate to the reflectivity of a standard light reflector (for example, a reflector having a reflectivity of 18%). For example, in the case of an underexposure shown in FIG. 8(A), the reflectivity of the whole image is smaller than the reflectivity of the standard light reflector. The shape of the tone curve is accordingly varied to be upward convex and make the output level higher than the input level. Such variation of the tone curve makes the reflectivity of the whole printed image approach to the reflectivity of the standard light reflector.

The auto lightness correction, however, has a weak point. In some cases, there is a requirement of adjusting the exposure only at a specified point on the image plane, for example, when a subject of photographing stands in a pin spot on a stage. Under such circumstances, the spot light metering, which determines the exposure based on the result of light measurement only in a specific area that is several percentage of the whole image plane, is adopted for photographing to generate image data as intended. The auto lightness correction automatically regulates the lightness on the basis of the whole image plane to give corrected image data against the user's intention for photographing.

The processing routine of the embodiment, however, determines whether the selected light metering for photographing is the spot light metering and carries out the auto adjustment excluding the auto lightness correction in the setting of the spot light metering (step S230) as discussed above. This arrangement desirably prevents the automatic correction of the lightness against the user's intention for photographing.

As described above, the system of the embodiment is arranged to avoid the auto lightness correction in the setting of the spot light metering selected for photographing, in response to the photographing information PI. This arrangement effectively prevents automatic correction of the lightness of printed images against the user's intention for photographing, which requires adjustment of the exposure only at a specified point on the image plane.

The CPU 231 functions as the 'automatic picture quality adjuster' and 'adjustment degree determiner' in the claims. The photographing information PI is included in the 'image processing control information' in the terminology of the claims.

D. Modifications

The embodiment and its applications discussed above are to be considered in all aspects as illustrative and not restrictive. There may be many modifications, changes, and alterations without departing from the scope or spirit of the main characteristics of the present invention. Some examples of possible modification are given below.

D-1. In the system of the above embodiment, the digital still camera 12 has the two available methods of light metering, that is, the divisional light metering and the spot light metering, and the auto lightness adjustment is not performed in the setting of the spot light metering selected for photographing. One possible application may also prohibit the auto lightness adjustment in the setting of multi-spot light metering or partial light metering selected for photographing with another digital still camera.

Another possible application may not prohibit auto adjustment but reduce the degree of auto adjustment. The degree of auto adjustment may be reduced by using a modified tone curve with reduced adjustment degree.

The modified tone curve with reduced adjustment degree may be obtained, for example, by giving adequate weights to the two tone curves (FIG. 8) used for auto adjustment and overlapping the weighted tone curves or by giving adequate weight to a linear tone curve and either of the two tone curves (FIG. 8) and overlapping the weighted tone curves.

The technique of the present invention is generally constructed to reduce the degree of auto adjustment in the setting of a specific light metering selected for photographing to measure the light in only a specified visual field area corresponding to part of a printed image.

It is preferable that methods of light metering recognizable by the image processing device based on the information of image files include averaged light metering, center emphasis light metering, spot light metering, multi-spot light metering, divisional light metering, and partial light metering. The technique of the invention is then advantageously applicable for image processing of image files in conformity with the specifications of Exif Ver. 2.2 and the later versions, which expect these methods of light metering.

D-2. The procedure of the above embodiment selects either of the auto adjustment including auto lightness adjustment or the auto adjustment excluding auto lightness adjustment according to the photographing information PI. One possible modification may select the auto adjustment including auto lightness adjustment only in the case of selection of a photographing mode to compute the adequate exposure based on the brightness of the whole image area, for example, in the setting of averaged light metering or divisional light metering. The technique of the present invention is generally constructed to prevent auto lightness adjustment of printed images in the setting of partial light metering selected for photographing.

D-3. The procedure of the above embodiment automatically determines execution or prohibition of auto lightness adjustment according to the photographing information PI. One modification may ask the user to select the degree of the auto adjustment, for example, in the case of selection of the center-weighted metering. The center-weighted metering is used for photographing with emphasis on the exposure in the center of the finder, for example, when a main subject is located in the center of the image plane as in the case of a portrait. The center-weighted metering measures the light, for example, with a degree of emphasis of approximately 60% on a circle occupying an area of about 10% in the center of the finder.

The center-weighted metering with a greater degree of emphasis is closer to the partial light metering, while the center-weighted metering with a less degree of emphasis is closer to the divisional light metering. One preferable application provides the user with a user interface (FIG. 9) to allow the user to select the degree of the auto adjustment. This arrangement advantageously ensures image processing desired by the user. The user interface preferably has options of printing multiple images with a variety of degree of the auto adjustment.

D-4. The procedure of the above embodiment prohibits auto lightness adjustment of printed images in the setting of partial light metering selected for photographing. One modified procedure may receive a manual input of an auto lightness adjustment prohibition command after photographing and determine to allow or prohibit auto lightness adjustment in response to the command. The technique of the invention is generally constructed to determine execution or prohibition of auto lightness adjustment according to image processing control information. This arrangement flexibly prevents forcible auto lightness adjustment of printed images against the user's intention for photographing.

D-5. The procedure of the above embodiment determines execution or prohibition of auto lightness adjustment according to the image processing control information. One modified arrangement may select the degree of auto lightness adjustment according to the image processing control information. One concrete procedure may provide multiple adjustment modes, which includes a high adjustment mode to make a relatively high degree of adjustment and a low adjustment mode to make a relatively low degree of adjustment, and select one of the multiple correction modes according to the image processing control information to automatically regulate the lightness of image data. In general, the present invention may be configured to determine the degree of the auto adjustment based on the image processing control information. The 'reducing the degree of auto adjustment' includes reduction of the auto adjustment degree to zero, that is, complete prohibition of the auto adjustment.

D-6. In the system of the above embodiment, the personal computer functions as the image processing device. The color printer or the digital still camera may have the functions of the image processing device. The technique of the invention is not restricted to color printing but is also applied to monochromatic printing.

D-7. In the system of the above embodiment, the ink jet color printer is used as the output device. The technique of the invention is also applicable to other output devices that can display images, for example, CRT displays, LCD displays, monitors, and projectors. Namely the invention is not restricted to printed images but is applicable for general images.

When part or all of the functions of the invention are actualized by the software configuration, the software (computer programs) may be provided in a form stored in a computer readable recording medium. The 'computer readable recording medium' of this invention is not limited to portable recording media, such as flexible disks and CD-ROMs, but also includes internal storage devices incorporated in computers like various RAMs and ROMs, as well as external storage devices fixed to computers like hard disks.

The invention claimed is:

1. An image output apparatus for outputting an image using image data, the image data being associated with light metering mode information, the light metering mode information showing a light metering mode used for photographing of the image, the image output apparatus comprising:
    a picture quality adjusting unit that adjusts lightness of the whole image to a degree; and
    an outputting unit that outputs the image adjusted by the picture quality adjusting unit,
    wherein the picture quality adjusting unit makes the degree less when the light metering mode information shows a light metering mode measuring a part of the image than when the light metering mode information shows other than the light metering mode measuring a part of the image.

2. The image output apparatus in accordance with claim 1, wherein
    the picture quality adjusting unit adjusts the lightness of the whole image to the degree without making the degree less when the light metering mode information shows other than the light metering mode measuring a part of the image.

3. The image output apparatus in accordance with claim 1, wherein
    the light metering mode information shows one of a plurality of metering modes including averaged metering, center-weighted metering, spot metering, multi-spot metering, divisional light metering, and partial light metering, and
    the light metering mode measuring the part of the image includes spot metering, multi-spot metering, divisional light metering, and partial light metering.

4. The image output apparatus in accordance with claim 3, wherein
    the picture quality adjusting unit includes a user interface for allowing a user to adjust the degree to adjust the lightness if the light metering mode information shows the center-weighted metering.

5. An image output method of outputting an image using image data from an image output apparatus, the image data being associated with light metering mode information, the light metering mode information showing a light metering mode used for photographing of the image, the image output method comprising:
    adjusting lightness of the whole image to a degree with a picture quality adjusting unit;
    outputting the image that has been adjusted by the lightness adjustment with an outputting unit; and
    making the degree less when the light metering mode information shows a light metering mode measuring a part of the image than when the light metering mode information shows other than the light metering mode measuring a part of the image.

6. A computer-readable storage medium having a computer program stored thereon, the computer program causing a computer to output an image using image data, the image data being associated with light metering mode information, the light metering mode information showing a light metering mode used for photographing of the image, the computer program comprising instructions for causing the computer to perform functions of:
    adjusting lightness of the whole image to a degree;
    outputting the image that has been adjusted by the lightness adjustment; and
    making the degree less when the light metering mode information shows a light metering mode measuring a part of the image than when the light metering mode information shows other than the light metering mode measuring a part of the image.

7. The image output apparatus in accordance with claim 1, wherein the picture quality adjusting unit includes:
    a degree determining unit that determines the degree according to a difference between reflectivity of the whole image and a prescribed reference value; and
    a degree reducing unit that reduces the determined degree to adjust the lightness when the light metering mode information shows a light metering mode measuring a part of the image.

* * * * *